July 12, 1949.  J. W. H. BALES  2,475,871
RAT AND ANIMAL TRAP

Filed Sept. 30, 1946  2 Sheets-Sheet 1

Inventor
J. W. H. Bales
By ⟨signature⟩, Attorneys.

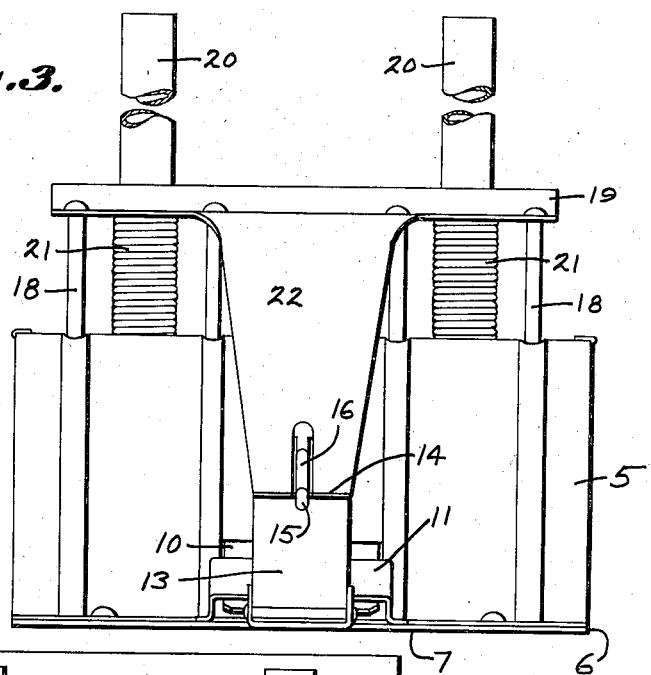
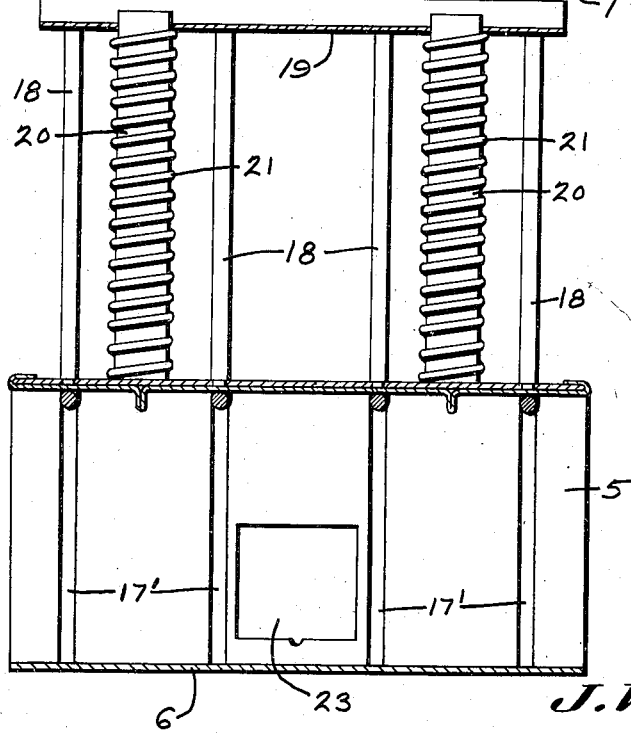

Patented July 12, 1949

2,475,871

UNITED STATES PATENT OFFICE 2,475,871

RAT AND ANIMAL TRAP

James W. H. Bales, Lake City, Fla.

Application September 30, 1946, Serial No. 700,319

2 Claims. (Cl. 43—86)

This invention relates to animal traps, and more particularly to traps designed for use in catching rats, mice, or similar small animals.

The primary object of the invention is to provide a trap of this character including a vertically movable jaw operating within the body portion, resilient means being provided for normally urging the jaw to its active position, to catch and hold an animal attempting to remove the bait from the trap.

A further object of the invention is the provision of at rap which may be readily and easily set, without danger of the operator injuring his hands or fingers, during the act of setting.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is an elevational view of the trap.

Figure 4 is a transverse sectional view through the body portion of the trap.

Figure 1:
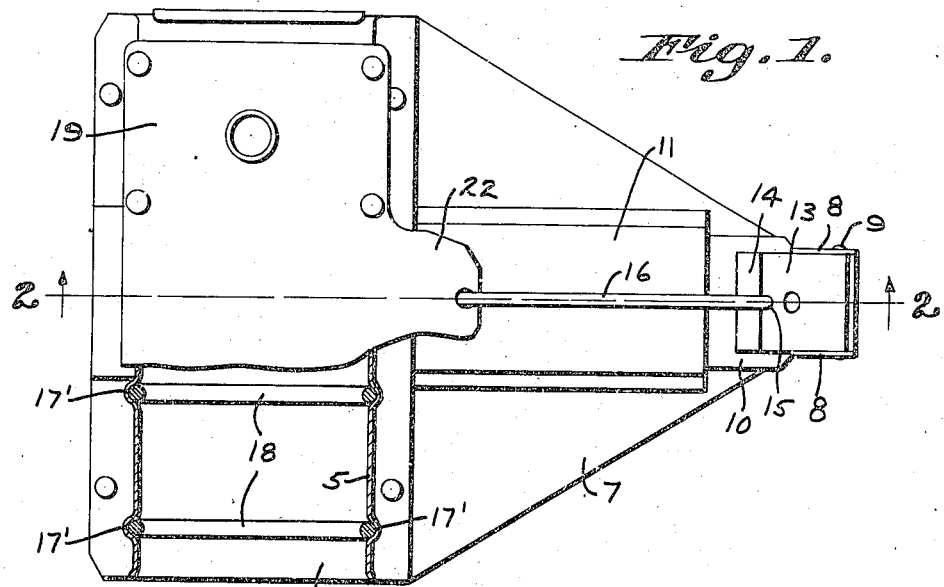
Figure 1 is a plan view of a trap construction in accordance with the invention.

Referring to the drawings, the device comprises a hollow rectangular body portion 5 open at its ends, to permit the trap to be entered at either end. As shown, the body portion 5 is secured to the base 6, which base is provided with a laterally extended portion 7 formed with a pair of upstanding ears 8, which are connected by means of the pin 9. This pin 9 forms a support for the treadle 10 that extends through the guard 11, which guard is of a construction to permit slight vertical movement of the treadle.

The treadle 10 is of a length to extend within the body portion 5, where it rests at a point intermediate the ends of the body portion. A tongue 12 is formed on the inner end of the treadle, and is disposed in spaced relation with the treadle, so that the bait may be positioned under the tongue, and held by frictional contact with the tongue.

At the opposite end of the treadle, is an upwardly curved portion 13 formed with a hook 14 at its extremity, the hook being designed to fit under the hook 15 formed at the free end of the trigger 16, the trigger being pivotally connected with the body portion of the trap, at 17. Spaced vertical grooves 17' are formed in the body portion, and accommodate the substantially U shaped members 18 that constitute the movable jaw of the trap, the U shaped members extending through openings formed in the top of the trap.

The upper ends of the U shaped members, are connected by means of the plate 19, forming a part of the movable jaw, which plate is formed with openings to accommodate the posts 20 that rise from the top of the body portion, there being provided coiled springs 21 disposed between the top of the body portion and under surface of the plate 19, to normally urge the movable jaw into clamping relation with the top of the body portion 5.

Figure 2:
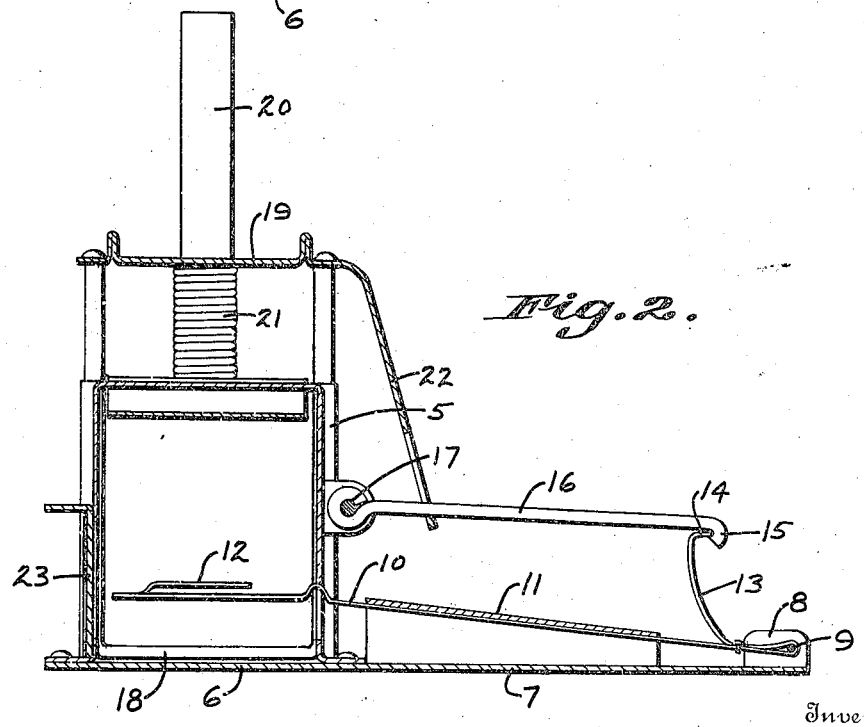
Figure 2 is a sectional view taken on line 2—2 of Figure 1.

Forming a part of the plate 19, and extending downwardly therefrom, is a tongue 22 formed with an elongated opening through which the trigger 16 extends, so that when the movable jaw is thrown downwardly against the tension of the springs 21, the trigger 16 may be swung to a position as shown by Figure 2, to hold the trigger in its inactive position, by contact of the hooks 14 and 15.

It will of course be obvious that when the treadle 10 is forced downwardly under the weight of an animal entering the trap, the curved portion 13 of the treadle will swing inwardly, disengaging the hook 15 of the trigger 16, and allowing the movable jaw to move upwardly within the body portion.

An opening is formed in the side of the body portion, the opening being closed by the closure 23, under normal conditions. This opening permits the trap to be baited from the side of the trap and eliminates any possibility of injury to the hands of the operator, in setting the trap.

I claim:

1. In a trap, an elongated body portion having open ends to permit of access to the body portion, a vertically movable jaw mounted within the body portion and cooperating with the top of the body portion to grip an animal, resilient means for normally urging the movable jaw to its active position, a tongue extending from the movable jaw and having an opening formed therein, a trigger including a rod pivotally connected to the body portion and disposed within the opening of the tongue, and a treadle pivotally mounted exteriorly of the body portion, one end of the treadle extending into the body portion, said treadle including a curved portion engaging the trigger to normally hold the trigger and movable jaw in a set position and said treadle operating to release the trigger and movable jaw when the treadle moves downwardly under the weight of an animal passing into the body portion.

2. In a trap, an elongated body portion having open ends to permit of access to the body portion, a vertically movable jaw within the body portion, a plate rigid with and movable with the jaw and mounted exteriorly of the body portion, a tongue carried by the plate and having an opening, a trigger extending through the opening, a treadle extending into the body portion, means on the treadle for engaging the trigger and normally holding the trigger and jaw in a set position, a guard plate under which the treadle operates, said guard plate restricting movement of the treadle in one direction, and said treadle being adapted to move downwardly to release the trigger and jaw, under the weight of an animal passing into the body portion.

JAMES W. H. BALES.

REFERENCES CITED

The following references are of record in the file of this patent:

UNITED STATES PATENTS

| Number | Name | Date |
| --- | --- | --- |
| 1,090,031 | Dawson | Mar. 10, 1914 |
| 1,799,394 | Schilling et al. | Apr. 7, 1931 |